US011798758B2

(12) United States Patent
Mizuno (10) Patent No.: US 11,798,758 B2
(45) Date of Patent: Oct. 24, 2023

(54) STEERING SWITCH DEVICE AND STEERING SWITCH SYSTEM (71) Applicant: KABUSHIKI KAISHA TOKAI RIKA DENKI SEISAKUSHO, Aichi (JP)

(72) Inventor: Shintaro Mizuno, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 158 days.

(21) Appl. No.: 17/429,033

(22) PCT Filed: Feb. 7, 2020

(86) PCT No.: PCT/JP2020/004986
§ 371 (c)(1),
(2) Date: Aug. 6, 2021

(87) PCT Pub. No.: WO2020/179361
PCT Pub. Date: Sep. 10, 2020

(65) Prior Publication Data
US 2022/0139647 A1    May 5, 2022

(30) Foreign Application Priority Data
Mar. 5, 2019    (JP) .................................. 2019-039185

(51) Int. Cl.
H01H 13/64    (2006.01)
B60R 16/027    (2006.01)

(52) U.S. Cl.
CPC ............ *H01H 13/64* (2013.01); *B60R 16/027* (2013.01); *B60K 2370/1446* (2019.05); *B60K 2370/782* (2019.05)

(58) Field of Classification Search
CPC ................... H01H 13/64; B60R 16/027; B60K 2370/1446; B60K 2370/782; B60K 2370/1434; B60K 35/00
See application file for complete search history.

(56) References Cited

U.S. PATENT DOCUMENTS 6,525,283 B2 * 2/2003 Leng .................... B60Q 1/1484
200/61.54
7,038,586 B2 * 5/2006 Wechsler ................. G05G 1/04
340/474
7,406,785 B2    8/2008 Noguchi
(Continued)

FOREIGN PATENT DOCUMENTS

JP    2005-257938 A    9/2005
JP    2012-062026 A    3/2012
(Continued)

Primary Examiner — Christopher E Leiby
(74) Attorney, Agent, or Firm — Thomas W. Cole; Calderon Safran & Cole P.C.

(57) ABSTRACT

A steering switch device includes a display arranged on a front side of a steering wheel of a vehicle to show a function in a switching manner, an input unit to receive an operation, and a control unit to execute the function shown on the display based on the operation received by the input unit. A steering switch system includes the steering switch device and a display device to show a view related to the display of the steering switch device.

10 Claims, 9 Drawing Sheets

(56) References Cited

U.S. PATENT DOCUMENTS

| | | | |
|---|---|---|---|
| 2001/0002646 A1* | 6/2001 | Leng | B60Q 1/1484 200/61.54 |
| 2005/0098417 A1* | 5/2005 | Miyako | B60Q 1/1484 200/61.54 |
| 2005/0200560 A1 | 9/2005 | Noguchi | |
| 2007/0186704 A1* | 8/2007 | Nishio | F16H 61/18 74/335 |
| 2008/0001931 A1* | 1/2008 | Szczerba | G06F 3/04847 345/184 |
| 2009/0165592 A1* | 7/2009 | Sakai | B62D 1/046 200/61.54 |
| 2010/0268426 A1* | 10/2010 | Pathak | G06F 3/04886 345/173 |
| 2010/0274483 A1* | 10/2010 | Wikel | G01C 21/3667 701/469 |
| 2012/0001742 A1* | 1/2012 | Nozoe | B60Q 9/007 701/49 |
| 2012/0267221 A1* | 10/2012 | Gohng | G06F 3/0338 200/61.54 |
| 2014/0081521 A1* | 3/2014 | Frojdh | B60R 16/037 701/36 |
| 2014/0371987 A1* | 12/2014 | Van Wiemeersch | G06F 3/01 701/41 |
| 2016/0264070 A1* | 9/2016 | Urakami | B60K 37/06 |
| 2017/0212633 A1* | 7/2017 | You | G06F 3/0412 |
| 2020/0089357 A1* | 3/2020 | Grau | G06F 3/0414 |
| 2020/0348771 A1* | 11/2020 | Clochard | G06F 3/03547 |
| 2021/0291868 A1* | 9/2021 | Okuda | B60W 30/09 |
| 2022/0118996 A1* | 4/2022 | Jaegal | B60K 37/06 |

FOREIGN PATENT DOCUMENTS

| | | |
|---|---|---|
| JP | 2013-163415 A | 8/2013 |
| JP | 2014-058293 A | 4/2014 |

\* cited by examiner

STEERING SWITCH DEVICE AND STEERING SWITCH SYSTEM

CROSS-REFERENCE TO RELATED APPLICATIONS

The present application is a U.S. National Phase of PCT/JP2020/004986 A1 filed on Feb. 7, 2020 claiming priority to Japanese Patent Application No. 2019-039185 filed on Mar. 5, 2019. The disclosure of the PCT Application is hereby incorporated by reference into the present Application.

TECHNICAL FIELD

The present invention relates to a steering switch device and a steering switch system.

BACKGROUND ART

A switch having a variable display structure is known in which a first view and a second view are displayed by switching light projected onto a translucent sheet between light from a first light source and light from a second light source that have different wavelengths (see, e.g., Patent Literature 1).

The switch has a tactile switch and is capable of determining in which display state the tactile switch has received an input, so that it can be used as two operation inputs.

CITATION LIST

Patent Literature

Patent Literature 1: JP 2005/257938 A

SUMMARY OF INVENTION

Technical Problem

For the switch disclosed in Patent Literature 1, it is difficult to switch between three or more operation inputs, i.e., to assign three or more functions. Therefore, to assign more functions, it is necessary to arrange multiple switches. Since users need to find a desired switch from among the multiple switches, a problem may arise that an area users need to scan is widen so that its operational performance degrades.

It is an object of the invention to provide a steering switch device and a steering switch system that can be operated switching functions without degradation of the operational performance.

Solution to Problem

According to an embodiment of the invention, a steering switch device comprises:
a display arranged on a front side of a steering wheel of a vehicle to show a function in a switching manner;
an input unit to receive an operation; and
a control unit to execute the function shown on the display based on the operation received by the input unit.

Advantageous Effects of Invention

According to an embodiment of the invention, a steering switch device and a steering switch system can be provided that can be operated switching functions without degradation of the operational performance.

DESCRIPTION OF EMBODIMENTS

Summary of the Embodiments

A steering switch device in embodiments includes displays arranged on a front side of a steering wheel of a vehicle to show functions in a switching manner, input units to receive operations, and a control unit that executes the functions shown on the displays based on the operations received by the input units.

This steering switch device is configured such that functions executable through the input unit can be switched by switching the function shown on the display, Therefore, unlike when plural switches are arranged so as to correspond to functions, the area users need to recognize is the area of the display and a decrease in operability can be suppressed even when the functions are switched. Thus, the steering switch device can be operated switching functions without degradation of the operational performance.

First Embodiment (General Configuration of a Steering Switch Device 1)

Figure 1A:
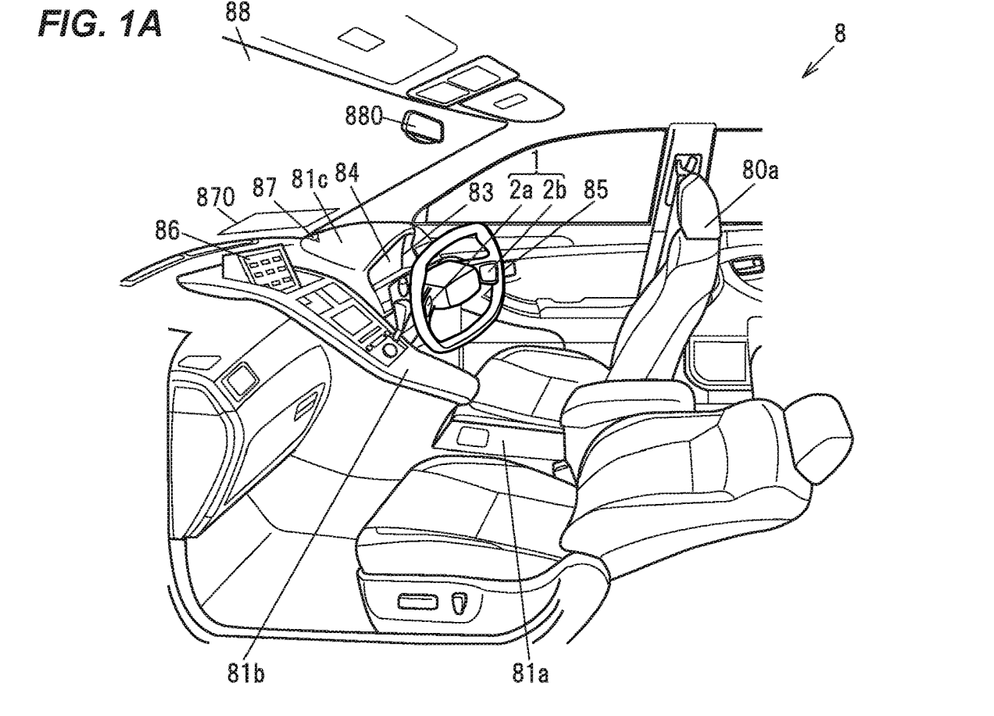
FIG. 1A is an explanatory diagram illustrating a vehicle interior in which a steering switch device in the first embodiment is mounted.
Figure 1B:
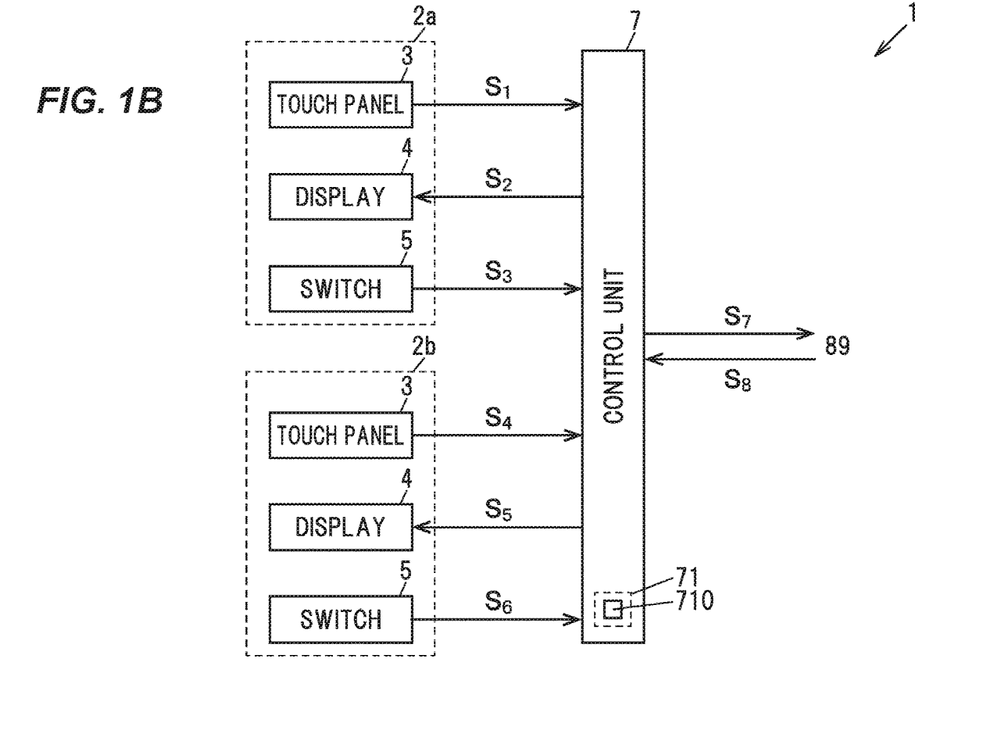
FIG. 1B is a block diagram illustrating the steering switch device in the first embodiment.
Figure 2A:
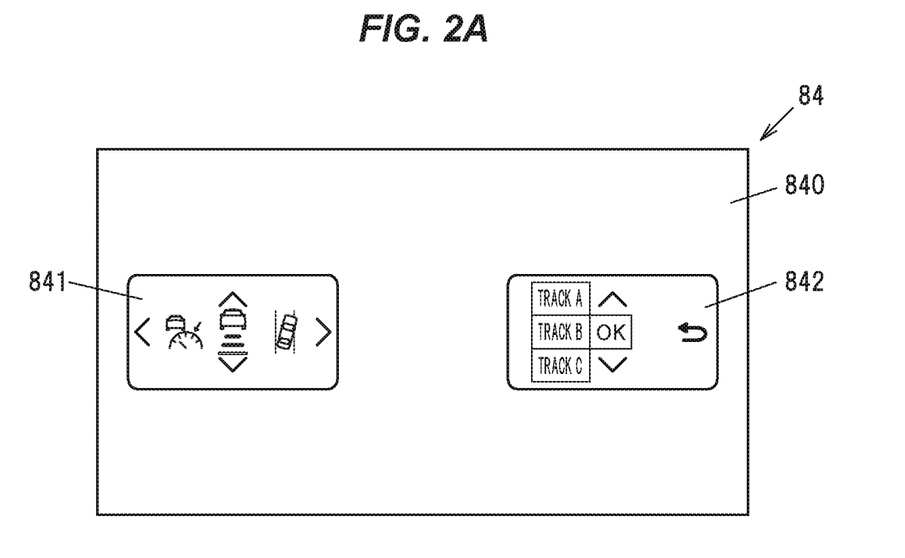
FIG. 2A is an explanatory diagram illustrating a meter display showing functions that can be controlled by operating the steering switch device in the first embodiment.
Figure 2B:
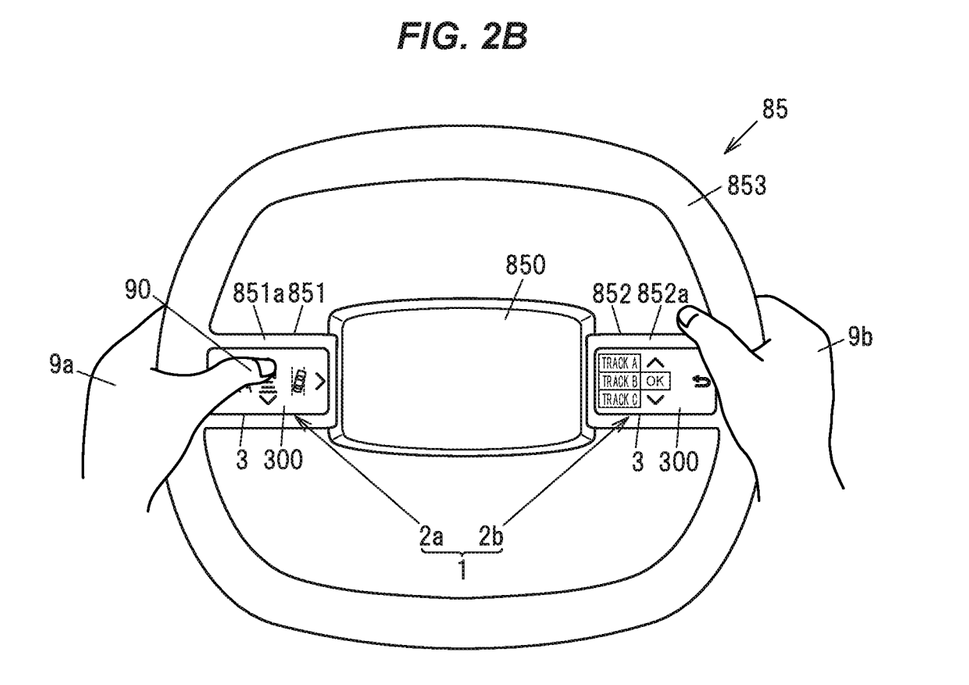
FIG. 2B is an explanatory diagram illustrating a steering wheel on which touch pads of the steering switch device in the first embodiment are arranged.
Figure 3A:
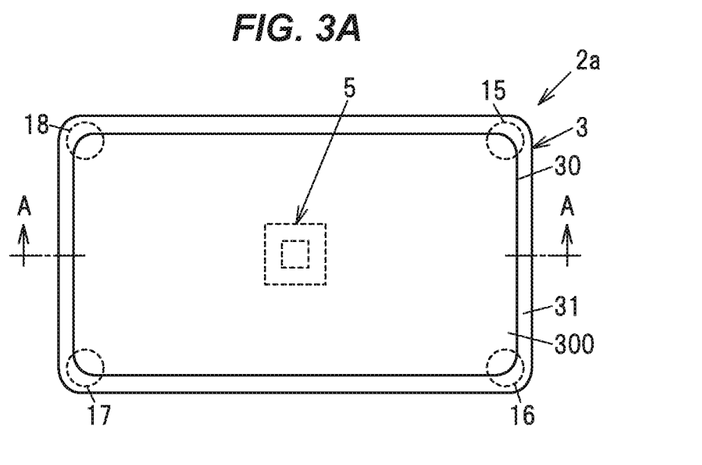
FIG. 3A is an explanatory diagram illustrating the touch pad of the steering switch device in the first embodiment.
Figure 3B:
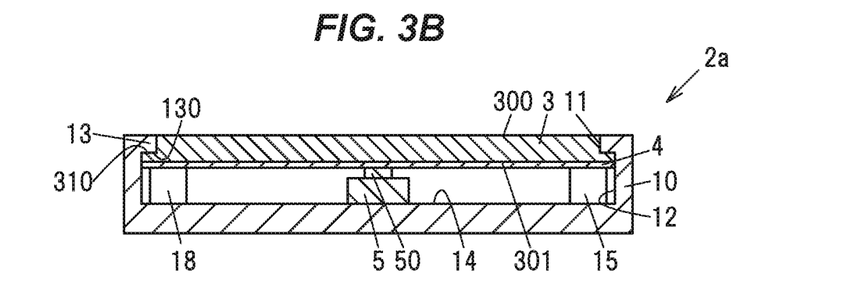
FIG. 3B is a cross sectional view when a cross section taken along line A-A line in FIG. 3A is viewed in a direction of arrow.
Figure 3C:
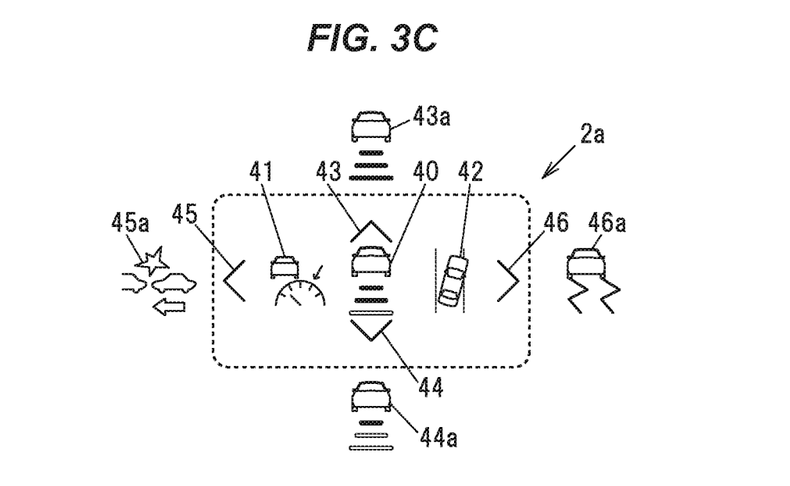
FIG. 3C is an explanatory diagram for explaining how to switch functions on the touch pad of the steering switch device in the first embodiment.

FIG. 1A is an explanatory diagram illustrating a vehicle interior, and FIG. 1B is a block diagram illustrating the steering switch device. FIG. 2A is an explanatory diagram illustrating a display screen of a meter display, FIG. 2B is an explanatory diagram illustrating a steering wheel. FIG. 3A is an explanatory diagram illustrating a touch pad, FIG. 3B is a cross sectional view showing the touch pad when taken along line A-A line in FIG. 3A, and FIG. 3C is an explanatory diagram for explaining how to switch functions.

In each drawing of the embodiments described below, a scale ratio may be different from an actual ratio. In addition, in FIG. 1B and also in FIGS. 6B and 9 described later, flows of main signals and information are indicated by arrows.

A steering switch device 1 in the first embodiment is mounted on, e.g., a steering wheel 85 of a vehicle 8, as shown in FIG. 1A. A user can operate the steering switch device 1 while holding the steering wheel 85. The steering switch device 1 is configured to operate, e.g., operated devices 89 that are on-board devices of the vehicle 8. As an example, the operated devices 89 are an air conditioner, a music and video reproducing device, a navigation device, and a vehicle control device that can perform various settings related to the vehicle 8 such as a function of keeping an inter-vehicle distance or a collision avoidance function, etc.

As an example, the vehicle 8 includes display devices such as a meter display 84 arranged on a meter panel 83, a main display 86 arranged on a center console 81b, a head-up display 87 that is arranged on an instrument panel 81c and projects a display object on a projection region 870 of a windshield 88, and a room mirror monitor 880 arranged on the windshield 88, as shown in FIG. 1A.

The steering switch device 1 is configured such that a hierarchical GUI (graphical user interface) is shown on at least one of these display devices. The steering switch device 1 in the first embodiment is configured to show a GUI on, e.g., the meter display 84, as shown in FIG. 2A. In this GUI, functions and setting values controllable by the steering switch device 1 are shown as images.

The steering switch device 1 has, e.g., displays 4 arranged on a front side of the steering wheel 85 of the vehicle 8 to show functions in a switching manner, input units to receive a operations, and a control unit 7 that executes the functions shown on the displays 4 based on the operations received by the input units, as shown in FIG. 1B, The hierarchical GUIs mentioned above are shown on the displays 4.

The input unit in the first embodiment has a touch panel 3 as a touch detection unit to detect a touch operation that is performed when selecting the function shown on the display 4.

The input unit in the first embodiment also has a switch 5 as a push detection unit to detect a push operation performed on the display 4.

That is, the input unit includes the touch panel 3 and the switch 5. However, the input unit is not limited to a combination of the touch panel 3 and the switch 5, and may be, e.g., only one of them, or a unit using a camera, or plural switches arranged side by side.

The steering switch device 1 in the first embodiment includes, e.g., a touch pad 2a and a touch pad 2b on the left and right of the steering wheel 85, as shown in FIG. 2B.

Each of the touch pad 2a and the touch pad 2b has the touch panel 3, the display 4 and the switch 5. The touch pad 2a and the touch pad 2b are assigned with different functions.

The touch pad 2a and the touch pad 2b are arranged on, e.g., left and right spoke portions (a spoke portion 851 and a spoke portion 852) of the steering wheel 85, as shown in FIG. 2B. The spoke portion 851 and the spoke portion 852 couple a base portion 850, on which an alai in or an airbag is arranged, to a ring portion 853 to be held by the user. In addition, for example, when the steering wheel is in a position at which the vehicle 8 travels straight as shown in FIG. 2B, the spoke portion 851 and the spoke portion 852 extend substantially horizontally and couple the base portion 850 to the ring portion 853.

The front surface of the steering wheel 85 mentioned above is, e.g., a surface facing the user, i.e., a front surface 851a of the spoke portion 851 and a front surface 852a of the spoke portion 852, as shown in FIG. 2B.

The touch pad 2a and the touch pad 2b can be operated in a state in which the user is holding near the coupling portions between the ring portion 853 and the spoke portion 851/the spoke portion 852. FIG. 2A shows the state in which the ring portion 853 of the steering wheel 85 is held by both hands (a left hand 9a and a right hand 9b), and the touch pad 2a is being operated by the thumb (an operating finger 90) of the left hand 9a. In this regard, the steering switch device 1 may be configured to include either the touch pad 2a or the touch pad 2b.

The functions assigned to the touch pad 2a and the touch pad 2b are shown on, e.g., the meter display 84 and also displayed on the respective displays 4, as shown in FIGS. 2A and 2B.

(Configuration of the Touch Pad 2a and the Touch Pad 2b)

As an example, the touch pad 2a has a rectangular shape with four rounded corners, as shown in FIG. 3A. The touch pad 2a also has a rib 31 around a main body 30. The touch pad 2b has the same shape as the touch pad 2a. However, the shape of the touch pad 2a and the touch pad 2b is not limited thereto. Hereinafter, the touch pad 2a will be mainly described.

The touch panel 3 is configured to detect a touch operation performed on an operation surface 300. For example, a resistive film type or capacitive type touch panel can be used as the touch panel 3. Since the touch panel 3 in the first embodiment is configured such that the view on the display 4 is transmitted therethrough and a push operation performed thereon is detected by the switch 5, a capacitive touch panel having transparent electrodes is used as the touch panel 3, as an example.

The touch pad 2a is configured to detect, e.g., a touch operation performed on mainly five locations (an icon 40 and an up icon 43 to a right icon 46: up, down, left, right and center), as shown in FIG. 3C. Thus, the transparent electrodes are arranged at five locations on the touch panel 3. The touch panel 3 may be a touch panel that has plural drive electrodes and plural detection electrodes alternately arranged while maintaining insulation therebetween and detects capacitances at intersections. In addition, the number of the transparent electrodes of the touch panel 3 is arbitrarily set according to the technical specification.

The transparent electrodes are attached to, e.g., a member with high transmittance such as glass or polycarbonate. Since the touch panel 3 in the first embodiment is configured such that the view on the display 4 is transmitted therethrough and a push operation is performed on the operation surface 300, the touch panel 3 is formed using glass that is highly transmissive and is hard and less likely to be bent by a push operation, as an example.

The touch panel 3 outputs information of capacitance of each of the plural transparent electrodes, as detection information, to the control unit 7. The touch panel 3 of the touch pad 2a outputs detection information $S_1$ to the control unit 7. The touch panel 3 of the touch pad 2b outputs detection information $S_4$ to the control unit 7. The control unit 7 compares capacitances based on the acquired detection information $S_1$ and detection information $S_4$ with a capacitance threshold 710 (described later) and determines that a touch operation has been performed on the transparent electrode at which a capacitance of not less than the capacitance threshold 710 is detected.

The touch panel 3 is attached to, e.g., a housing 10 so that the operation surface 300 is exposed from an opening 11, as shown in FIG. 3B. The housing 10 has, e.g., a box shape with the opening 11 on the upper surface. The opening 11 is formed by, e.g., providing a protruding portion 13 that protrudes inward from an inner surface 12 of an upper portion of the housing 10, as shown in FIG. 3B. A lower surface 130 of the protruding portion 13 faces an upper surface 310 of the rib 31 of the touch panel 3.

For example, the switch 5 and a first elastic body 15 to a fourth elastic body 18 are arranged between a back surface 301 of the touch panel 3 and a bottom surface 14 of the housing 10, as shown in FIGS. 3A and 3B. The switch 5 and the first elastic body 15 to the fourth elastic body 18 apply an elastic force to the touch panel 3 and presses the upper surface 310 of the rib 31 of the touch panel 3 against the lower surface 130 of the protruding portion 13 of the housing 10. The touch panel 3 does not come off of the housing 10 due to this contact between the rib 31 and the protruding portion 13.

(Configuration of the Display 4)

The display 4 is attached to, e.g., the back surface 301 of the touch panel 3, as shown in FIG. 3B. The display 4 is, e.g., an LED (Light-Emitting Diode) display or an organic EL (Electro-Luminescence) display. The display 4 in the first embodiment is an organic EL display.

The display 4 shows plural functions. In FIG. 3C, plural functions are shown as, e.g., the icon 40 to an icon 42. FIG. 3C shows an example of icons, etc., shown on the touch pad 2a on the left side of the steering wheel 85. As an example, seven icons (the icon 40 to the right icon 46) are shown on the display 4. The display 4 may be configured to show one function. In this case, the steering switch device 1 enables operations of plural functions by switching the displayed function.

The icon 40 is a currently selected function. The icon 40 indicates, e.g., a function of keeping an appropriate inter-vehicle distance to a vehicle in front. When the user sets the inter-vehicle distance to, e.g., increase the inter-vehicle distance, a touch operation is performed on the up icon 43 to scroll the icons downward from above so that an icon 43a is displayed, as shown in FIG. 3C. On the other hand, to reduce the inter-vehicle distance, a touch operation is performed on the down icon 44 to scroll the icons upward from below so that an icon 44a is displayed. Then, when the displayed icon is the icon of the desired function, the user confirms the selection by performing a push operation on the icon displayed in the center.

The icon 41 and the icon 42 shown on the left and right of the currently selected icon 40 indicate functions that can be switched from the function of the icon 40. The icon 41 indicates, e.g., a function with a mode to travel at a set speed without depressing an accelerator pedal or a mode to accelerate, decelerate or stop according to a change in the vehicle speed of the vehicle in front, etc. Meanwhile, the icon 42 indicates, e.g., a function of issuing a notification in case that there is a possibility of departing from a lane or road.

When the user performs a touch operation on the left icon 45, the icons shown on the display 4 are scrolled from left to right, and an icon 45a assigned to a function different from the function which was displayed is displayed. The icon 45a indicates, e.g., a function of assisting a collision avoidance operation when it is judged that the possibility of collision is high.

Meanwhile, when the user performs a touch operation on the right icon 46, the icons shown on the display 4 are scrolled from right to left, and an icon 46a assigned to a function different from the function which was displayed is displayed. The icon 46a indicates, e.g., a function of stabilizing the posture when the vehicle 8 turns.

When these icons (the icon 40 to the icon 42, the icon 43a to the icon 46a) are shown between the up icon 43 and the down icon 44, the user can make settings, etc., of the function by performing a touch operation on the up icon 43 or the down icon 44 and scrolling the icons.

The images shown on the displays 4 of the touch pad 2a and the touch pad 2b are also shown as, e.g., a left image 841 and a right image 842 on the meter display 84, as shown in FIG. 2A, The user can operate the steering switch device 1 by looking at the meter display 84 in front of him/her without moving the line of sight to the touch pad 2a and the touch pad 2b. The left image 841 and the right image 842 shown on the display device such as the meter display 84 are not limited to images similar to the images shown on the displays 4 and, e.g., more detailed information may be shown as images or simple information may be shown as images.

As an example, the display 4 of the right touch pad 2b shows a function of selecting music (track A to track C), as shown in FIGS. 2A and 2B. The touch panel 3 of the touch pad 2b has transparent electrodes arranged at positions similar to those of the touch panel 3 of the touch pad 2a and is configured to detect a touch operation on up, down, left, right and center.

The display 4 shows a view based on a display control signal output from the control section 7. This display control signal is generated based on, e.g., function information $S_8$ output from the operated device 89, as shown in FIG. 19. The function information $S_8$ is, e.g., information of images of the functions assigned to the touch pad 2a and the touch pad 2b. The display 4 of the touch pad 2a shows a view based on a display control signal $S_2$. The display 4 of the touch pad 2b shows a view based on a display control signal $S_5$.

As a modification, the control unit 7 may have a table that associates, e.g., information of functions to be shown on the displays 4, icons of the functions and signals to execute the functions, etc. In this case, the control unit 7 retrieves, from the table, the image to be switched to, based on the performed operation and causes the display 4 to show it. Then, when received an instruction to execute the displayed function, the control unit 7 retrieves a signal to execute the instructed function from the table and outputs it.

(Configuration of the Switch 5)

The switch 5 is arranged, e.g., at the center of the operation surface 300, as shown in FIGS. 3A and 3B. The switch 5 is a microswitch that detects depression of the touch panel 3, i.e., a push operation performed on the operation surface 300.

The switch 5, together with the first elastic body 15 to the fourth elastic body 18, applies an elastic force to the touch panel 3 so that the touch panel 3 is in contact with the housing 10. Thus, an initial load (preload) is applied to the switch 5.

The switch 5 is configured to be turned on when a button 50 is pushed in by a push operation, and to be turned off when the push operation ends and the button 50 returns to the original position with ascension of the touch panel 3. In this regard, the switch 5 is not limited to a mechanical switch such as a microswitch, and may be, e.g., a contactless switch using a magnetic sensor or a load sensor that detects a push operation by detecting a load caused by the push operation.

The switch 5, when turned on, outputs a switch signal to the control unit 7. The switch 5 of the touch pad 2a outputs a switch signal $S_3$ to the control unit 7. The switch 5 of the touch pad 2b outputs a switch signal $S_6$ to the control unit 7.

(Configuration of the First Elastic Body 15 to the Fourth Elastic Body 18)

As the first elastic body 15 to the fourth elastic body 18, it is possible to use, e.g., sponge, coil spring, or rubber, etc. The first elastic body 15 to the fourth elastic body 18 in the first embodiment are coil springs, as an example.

The first elastic body 15 to the fourth elastic body 18 are arranged at four corners of the touch panel 3. The first elastic body 15 to the fourth elastic body 18 support the touch panel 3 and also apply an elastic force to the touch panel 3 in a direction opposite to the push operation direction.

(Configuration of the Control Unit 7)

The control unit 7 is, e.g., a microcomputer composed of a CPU (Central Processing Unit) performing calculation and processing, etc., of the acquired data according to a stored program, and a RAM (Random Access Memory) and a ROM (Read Only Memory) 71 as semiconductor memories, etc. The ROM 71 stores a program for operation of the control unit 7 and the capacitance threshold 710, etc., as an example. The RAM is used as, e.g., a storage area to temporarily store calculation results, etc. The control unit 7 also has, inside thereof, a means to generate a clock signal and operates based on the clock signal. In this regard, the program and the capacitance threshold 710 may be stored in the RAM or may be stored in a storage device connected to the control unit 7.

The capacitance threshold 710 is a threshold used to detect a touch operation. The control unit 7 compares capacitances, which are based on the detection information $S_1$ and the detection information $S_4$ acquired from the touch panels 3 of the touch pad 2a and the touch pad 2b, with the capacitance threshold 710 and determines that a touch operation has been performed on the transparent electrode at which a capacitance of not less than the capacitance threshold 710 is detected. Then, the control unit 7 outputs operation information $S_7$, which includes information that a touch operation has been performed and information of the transparent electrode which detected the touch operation, to the operated device 89.

The control unit 7 also determines a push operation based on the switch signal $S_3$ and the switch signal $S_6$ acquired from the switches 5 of the touch pad 2a and the touch pad 2b. When a push operation is detected, the control unit 7 outputs the operation information $S_7$, which includes information that a push operation has been performed and information of the touch pad that detected the push operation, to the operated device 89.

Figure 4:
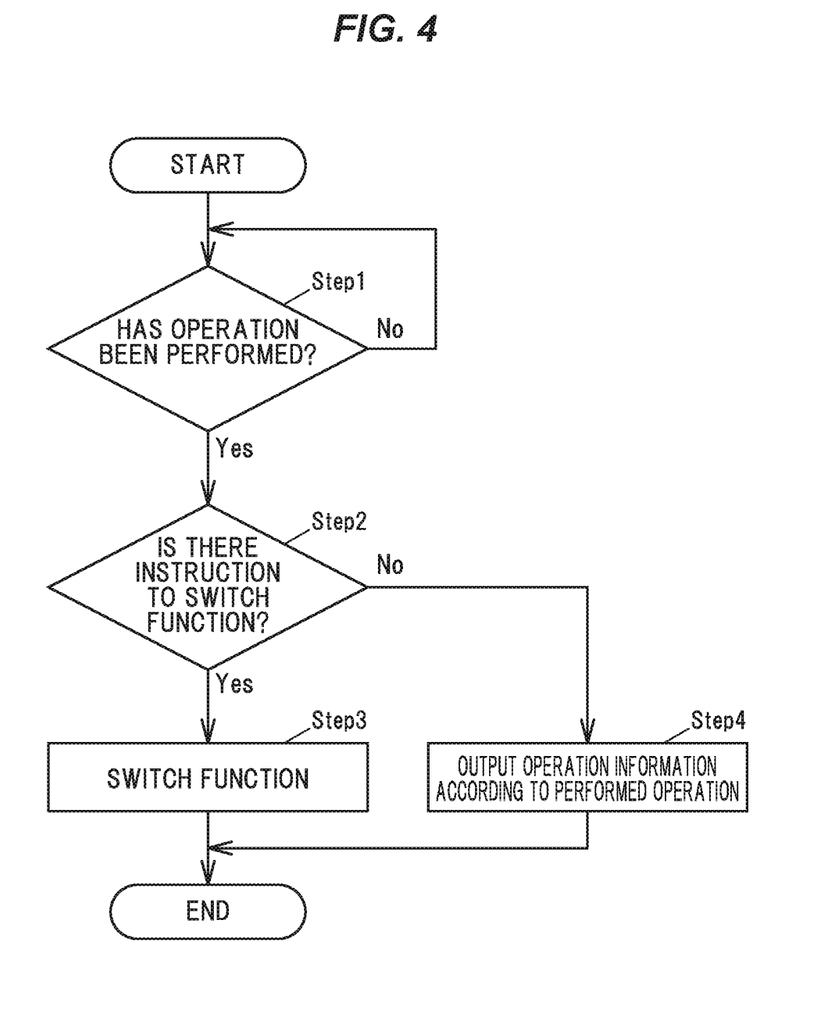
FIG. 4 is a flowchart showing an operation of the steering switch device in the first embodiment.

Next, an example of a function switching operation of the steering switch device 1 in the first embodiment will be described with the flowchart of FIG. 4.

(Operation)

The control unit 7 of the steering switch device 1 monitors the detection information $S_1$, the detection information $S_4$, the switch signal $S_3$ and the switch signal $S_6$ from the touch pad 2a and the touch pad 2b.

When it is "Yes" in Step 1, i.e., when an operation is detected (Step 1: Yes) and the detected operation is an operation to switch the function (Step 2: Yes), the control unit 7 switches the function executable through the operated touch pad (Step 3), and ends the operation.

In particular, e.g., after the touch pad 2a received the operation, the control unit 7 outputs the operation information $S_7$ to the operated device 89. Then, based on, e.g., the function information $S_8$ output from the operated device 89, the control unit 7 generates and outputs the display control signal to the display 4 to switch the displayed function.

At this stage, when the detected operation is not an operation to instruct the switching of the function in Step 2 (Step 2: No), the control unit 7 generates the operation information $S_7$ corresponding to the performed operation and outputs it to the operated device 89 (Step 4).

Effects of the First Embodiment

The steering switch device 1 in the first embodiment can be operated switching functions without degradation of the operational performance. In particular, the steering switch device 1 is configured such that functions executable through the touch panel 3 can be switched by switching the function shown on the display 4. Therefore, unlike when plural switches are arranged so as to correspond to functions, the area users need to recognize is the area of the display 4 and a decrease in operability can be suppressed even when the functions are switched. Thus, the steering switch device can be operated switching functions without degradation of the operational performance.

The touch panel 3, the switch 5 and the display 4, which constitutes the input unit, are arranged on the housing 10 so as to overlap each other, and the display position and the operation position overlap each other. Therefore, as compared to when such members are arranged away from each other, the steering switch device 1 can be intuitively operated. In addition, the steering switch device 1 can be easily reduced in size and requires a small installation space, as compared to when those members are arranged away from each other. Therefore, while the steering switch device 1 can operate many functions, it can be operated intuitively and also can be arranged on a place with a small installation space such as the spoke portion 851 and the spoke portion 852 of the steering wheel 85.

Since the steering switch device 1 can be arranged on the spoke portion 851 and the spoke portion 852 which are close to the user, visibility is improved and operability is also improved as compared to when the display and the input unit are arranged away from each other or when plural switches are arranged side by side.

Since the installation space is small, the steering switch device 1 has a high degree of freedom in installation position. In addition, since the steering switch device 1 can show the images indicating the functions by means of the displays 4, it has a high degree of freedom in the image to be displayed and is excellent in design, as compared to when showing a fixed view.

Second Embodiment

The second embodiment is different from other embodiments in that selector switches to switch functions are included.

In the embodiment described below, portions having the same functions and configurations as those in the first embodiment are denoted by the same reference numerals as those in the first embodiment, and the description thereof will be omitted.

Figure 5A:
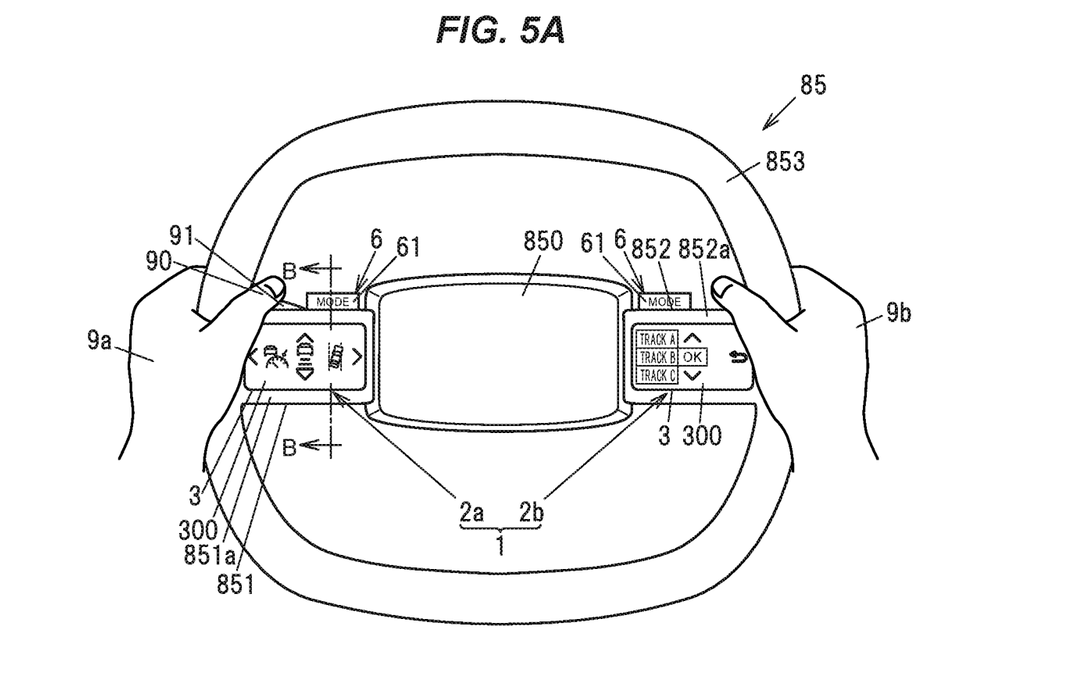
FIG. 5A is an explanatory diagram illustrating how to operate a selector switch of the steeling switch device in the second embodiment.
Figure 5B:
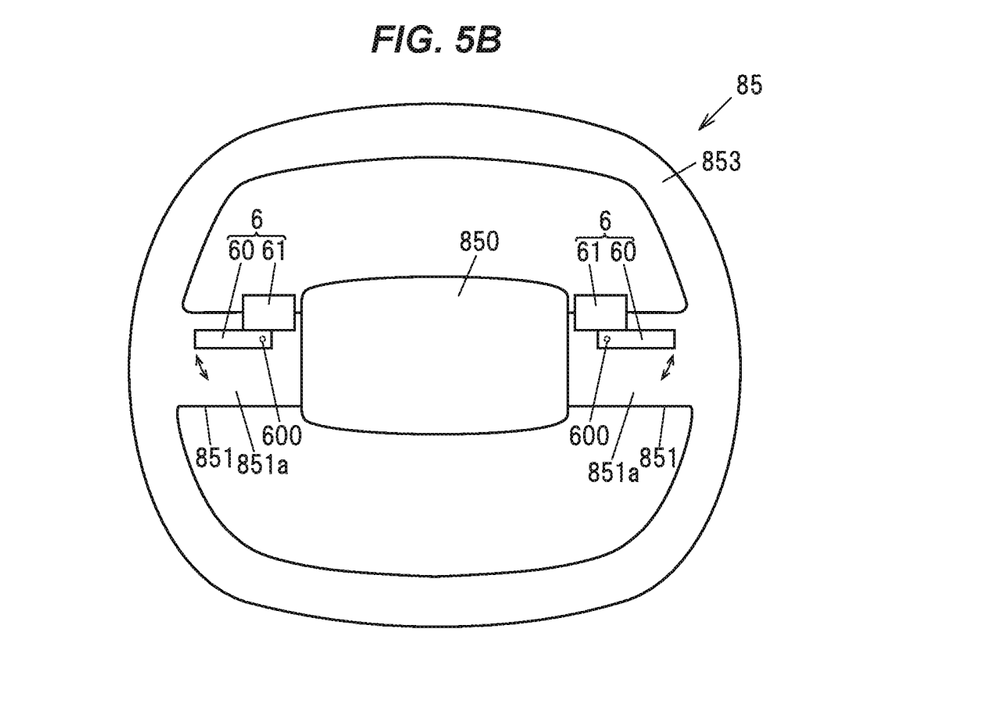
FIG. 5B is an explanatory diagram illustrating the selector switches of the steering switch device in the second embodiment that are arranged on the back side of the steering wheel.
Figure 6A:
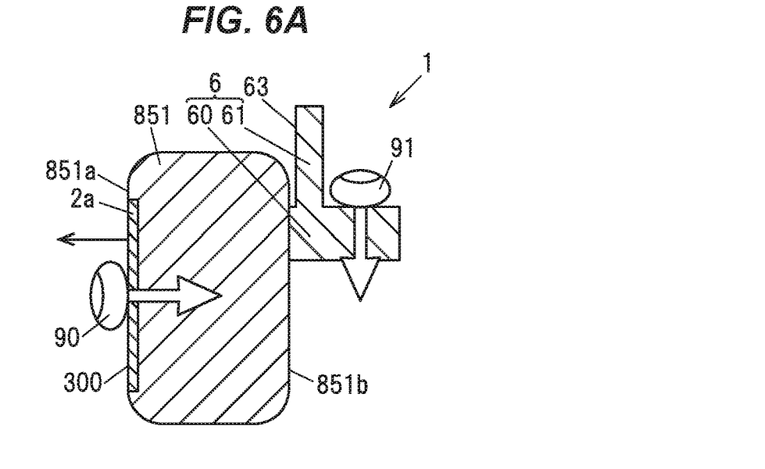
FIG. 6A is a cross sectional view for explaining an operation direction of the steering switch device in the second embodiment when a cross section taken along line B-B line in FIG. 5A is viewed in a direction of arrow.
Figure 6B:
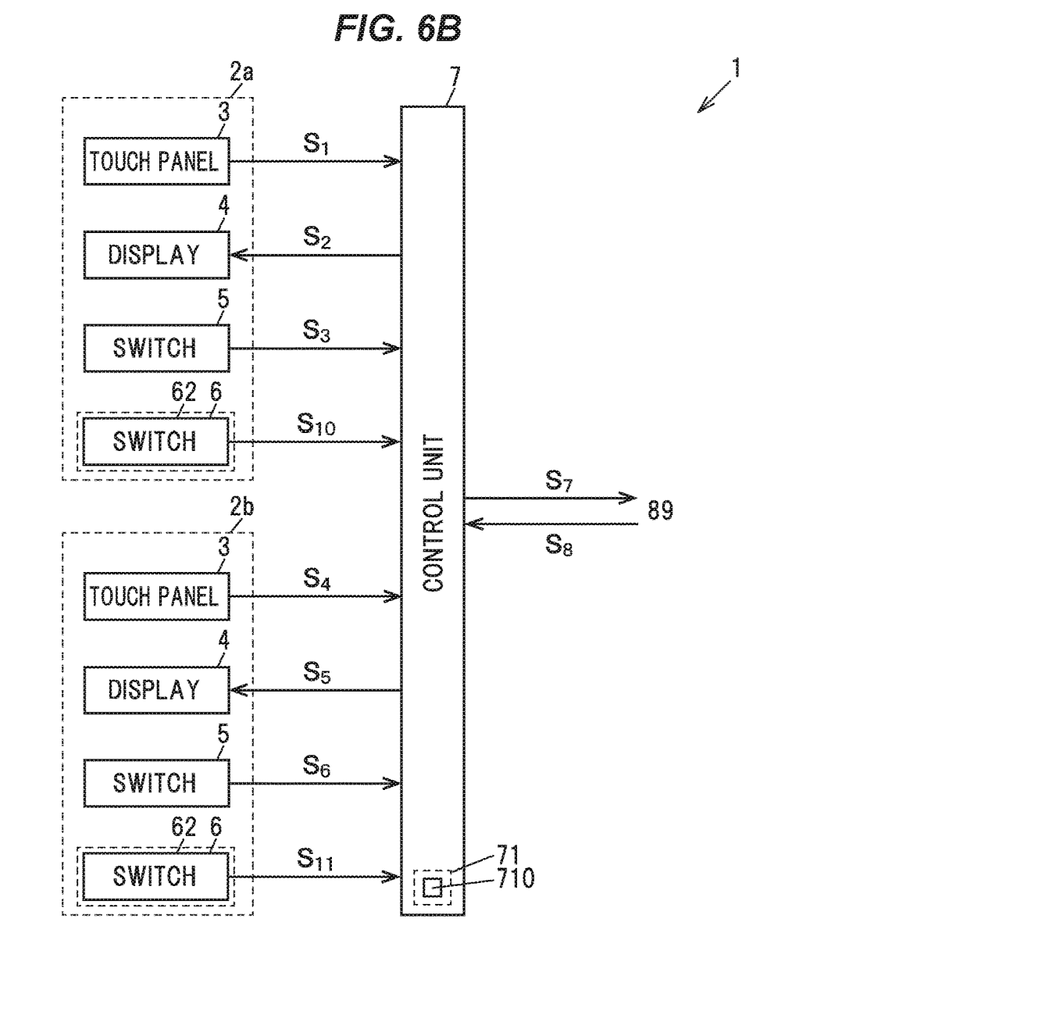
FIG. 6B is a block diagram illustrating the steering switch device in the second embodiment.
Figure 7A:
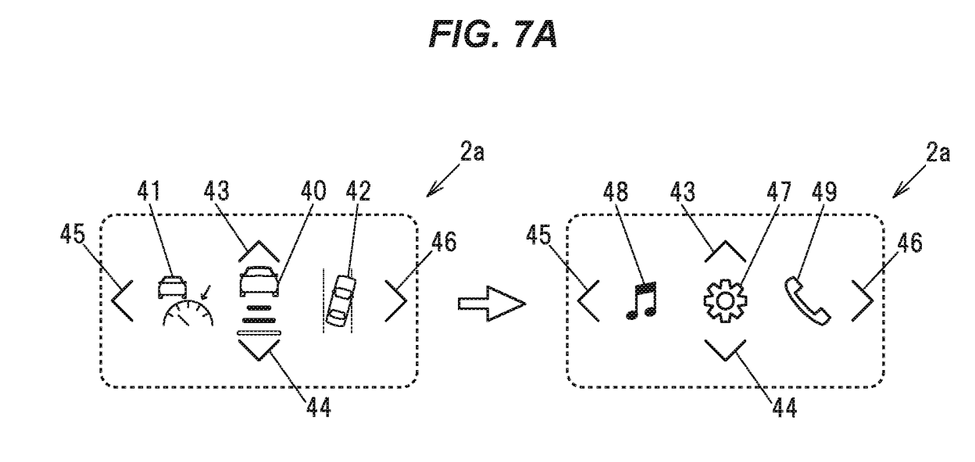
FIG. 7A is an explanatory diagram illustrating transitions of views on a display based on switching of function of the steering switch device in the second embodiment.
Figure 7B:
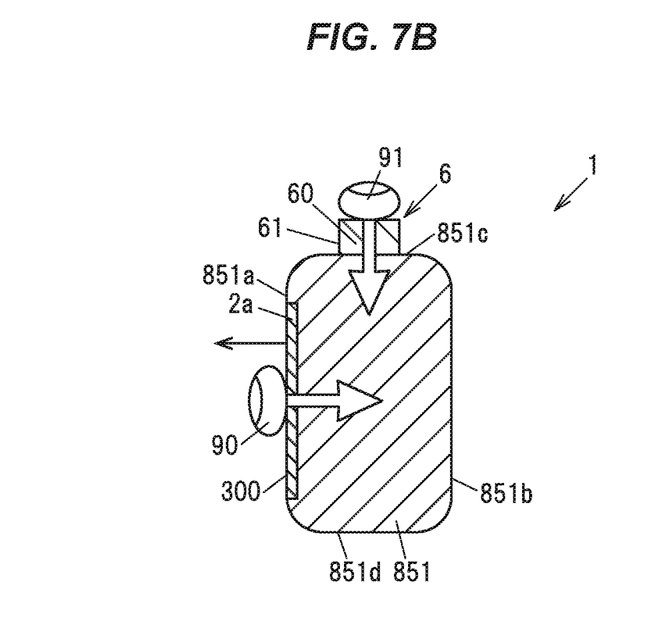
FIG. 7B is a cross sectional view showing a main part of the selector switch as a modification of the steering switch device in the second embodiment.

FIG. 5A is an explanatory diagram illustrating how to operate a selector switch, and FIG. 5B is an explanatory diagram illustrating the selector switches. FIG. 6A is a cross sectional view for explaining an operation direction of the steering switch device, and FIG. 6B is a block diagram illustrating the steering switch device. FIG. 7A is an explanatory diagram illustrating transitions of views on the display based on switching of function, and FIG. 7B is a cross sectional view showing a main part of the selector switch in a modification. FIG. 6A is a cross sectional view when a cross section taken along line B-B of FIG. 5A is viewed in a direction of arrow.

The steering switch device 1 in the second embodiment is arranged on, e.g., the steering wheel 85 and has selector switches 6 to switch functions that are shown on the displays 4 and are executed by operations received by the input units, as shown in FIGS. 5A and 5B.

The steering switch device 1 is arranged so that, e.g., the displays 4, the input units and the selector switches 6 are positioned on the right and left of the steering wheel 85, as shown in FIGS. 5A and 5B.

The input unit in the second embodiment has the touch panel 3 as a touch detection unit to detect a touch operation that is performed when selecting the function shown on the display 4, and the switch 5 as a push detection unit to detect a push operation performed on the display 4. Thus, each of the touch pad 2a and the touch pad 2b has, e.g., the touch panel 3, the display 4, the switch 5 and the selector switch 6, as shown in FIG. 6B.

The steering switch device 1 is positioned such that, e.g., the touch pad 2a and the touch pad 2b are arranged on the front surface 851a of the spoke portion 851 and the front surface 852a of the spoke portion 852 of the steering wheel 85, i.e., on the front side of the steering wheel 85, as shown in FIGS. 5A and 5B.

On the other hand, the selector switches 6 are arranged on the back side of the steering wheel 85. The selector switches 6 in the second embodiment are arranged on, e.g., a back surface 851b of the spoke portion 851 and a back surface 852b of the spoke portion 852, i.e., on the back side of the steering wheel 85, as shown in FIG. 5B.

The selector switch 6 includes, e.g., an operating knob 60 that is operated in a direction intersecting a normal direction to the surface of the display 4, as indicated by an arrow in FIG. 6A, Since the display 4 is attached to, e.g., the back surface 301 of the touch panel 3 as shown in FIG. 3A, the surface of the display 4 is substantially parallel to the operation surface 300 of the touch panel 3.

Thus, the normal direction to the surface of the display 4 is substantially the same direction as the normal direction to the operation surface 300 of the touch panel 3. Meanwhile, the touch operation direction is, e.g., a direction from left to right on the paper of FIG. 6A. The operation direction of the operating knob 60 of the selector switch 6 is, e.g., a downward direction from above on the paper of FIG. 6A. Thus, the operation direction of the operating knob 60 is a direction intersecting the normal direction to the display 4.

The operating knob 60 is provided with, e.g., a display portion 61 configured such that a sign indicating switching of function is visible from the front side of the steering wheel 85, as shown in FIG. 5A. In FIG. 5A, "MODE" is shown on the display portion 61, as an example. The selector switch 6 may be configured such that the operating knob 60 and the display portion 61 are integrally formed or the display portion 61 is attached to the operating knob 60.

The operating knob 60 has, e.g., a plate shape, as shown in FIG. 5B. In addition, the operating knob 60 is configured to rotate in a direction of arrow about a rotating shaft 600. The display portion 61 is provided on the operating knob 60 so as to be located above the rotating shaft 600. The operating knob 60 and the display portion 61 are formed using, e.g., a resin material or a metal material.

The display portion 61 has a plate shape that protrudes upward from the operating knob 60 on the rotating shaft 600 side. Letters of "MODE", which bring to mind the switching of functions, are formed by printing, etc., on a front surface 63 of the display unit 61 that faces the user, e.g., on the front side of the steering wheel 85 (on the side where the front surface 851a of the spoke portion 851 and the front surface 852a of the spoke portion 852 are located). In this regard, the sign on the display portion 61 is not limited thereto. In addition, the sign on the display portion 61 is not limited to being formed by printing. For example, the configuration may be such that the operating knob 60 and the display portion 61 are formed as a light guide and a light-blocking film covering the entire area is partially removed so that the letters of "MODE" are illuminated.

The selector switch 6 has, e.g., a switch 62 to detect an operation on the operating knob 60 and outputs a switch signal, which indicates that the operation has been performed, to the control unit 7, as shown in FIG. 6B. The selector switch 6 of the touch pad 2a outputs a switching signal $S_{10}$ to the control unit 7. The selector switch 6 of the touch pad 2b outputs a switching signal $S_{11}$ to the control unit 7.

Here, the selector switch 6 is configured such that the operation direction of the selector switch 6 by an operating finger 91 (the index finger) is different from and intersects with the operation direction of the touch pad 2a by the operating finger 90 (the thumb), as described above.

When the operation direction of the operating knob 60 is, e.g., a direction of pulling toward the user, it is the same as an operation direction of a paddle shifter lever to shift gears of the vehicle 8 and it is thus difficult to have both the operating knob 60 and the paddle shifter. However, the operating knob 60 in the second embodiment is operated in a direction intersecting the normal direction to the operation surface 300 of the touch panel and it is thus possible to have both the operating knob 60 and the paddle shifter.

The selector switch 6 is arranged on, e.g., the back side of the steeling wheel 85, as shown in FIGS. 5A and 5B. Thus, the user can easily place the operating finger 91 on the operating knob 60 by extending it while holding the steering wheel 85 and can switch the function by operating and pressing down the operating knob 60 in a direction the operating finger 91 flexes.

When, e.g., the touch pad 2a is assigned with a function related to cruise control of the vehicle 8 as shown in FIG. 7A, the user can switch to a function related to settings of music, etc., by operating the operating knob 60.

An icon 47 is an icon indicating a function of making various settings, etc., of the vehicle 8. An icon 48 is, e.g., an icon indicating a function of music reproduction, etc. An icon 49 is, e.g., an icon indicating a function related to a telephone.

As a modification, the selector switch 6 may be positioned such that the operating knob 60 is arranged at least one of upper and lower surfaces of the spoke portion of the steering wheel 85. As an example, the selector switch 6 arranged on the left side of the steering wheel 85 is arranged on an upper surface 851c of the spoke portion 851, as shown in FIG. 7B. The display portion 61 of the selector switch 6 is a portion of the operating knob 60 exposed from the upper surface 851c. Alternatively, the selector switch 6 may be arranged on, e.g., a lower surface 851d as shown in FIG. 7B.

Figure 8:
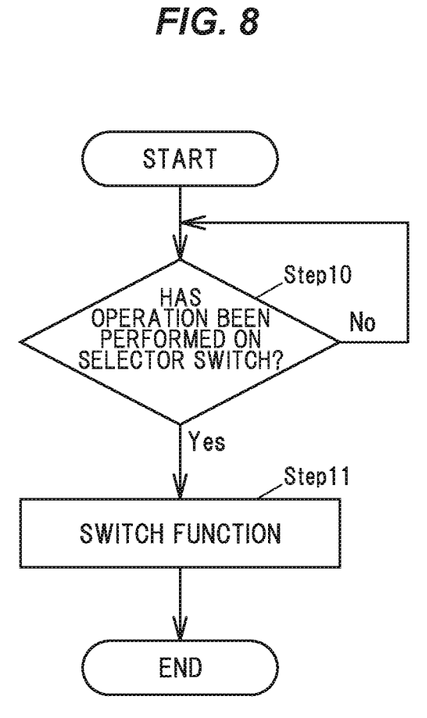
FIG. 8 is a flowchart showing an operation of the steering switch device in the second embodiment.

Next, an example of a function switching operation of the steering switch device 1 in the second embodiment will be described with the flowchart of FIG. 8.

(Operation)

The control unit 7 of the steering switch device 1 monitors the switching signal $S_{10}$ and the switching signal $S_{11}$ output from the selector switches 6 of the touch pad 2a and the touch pad 2b.

When it is "Yes" in Step 10, i.e., when the selector switch 6 is operated (Step 10: Yes), the control unit 7 switches the function executable through the touch pad located on the operated selector switch 6 side (Step 11), and ends the operation.

In particular, e.g., after the selector switch 6 on the touch pad 2a side received the operation, the control unit 7 outputs the operation information $S_7$ to the operated device 89. Then, based on, e.g., the function information $S_8$ output from the operated device 89, the control unit 7 generates and outputs the display control signal $S_2$ to the display 4 to switch the displayed function.

Effects of the Second Embodiment

The steering switch device 1 in the second embodiment includes the selector switches 6. Therefore, as compared to when not including, it is easier for the user to know how to switch the function. In addition, the steering switch device 1 can easily switch the functions assigned to the touch pad 2a and the touch pad 2b by the selector switches 6.

The selector switches 6 of the steering switch device 1 are arranged on the back side of the steering wheel 85. Therefore, as compared to when arranging on the front side, the moving range of the user's hand or operating finger is small and it is easy to operate while holding the steeling wheel 85.

The steering switch device 1 is configured such that the operation direction of the selector switch 6 is a direction intersecting the push operation direction of the touch panel 3. Therefore, as compared to when it is parallel, erroneous operations are less likely to occur.

The steering switch device 1 is configured such that the display portion 61 is located at a position visible from the user holding the steering wheel 85. Therefore, as compared to when the display portion is not provided, the user can easily find the position of the operating knob 60 in a state of sitting in a driver's seat 80a and operability is good.

Third Embodiment

The third embodiment is different from the other embodiments in that s a system including a display device.

Figure 9:
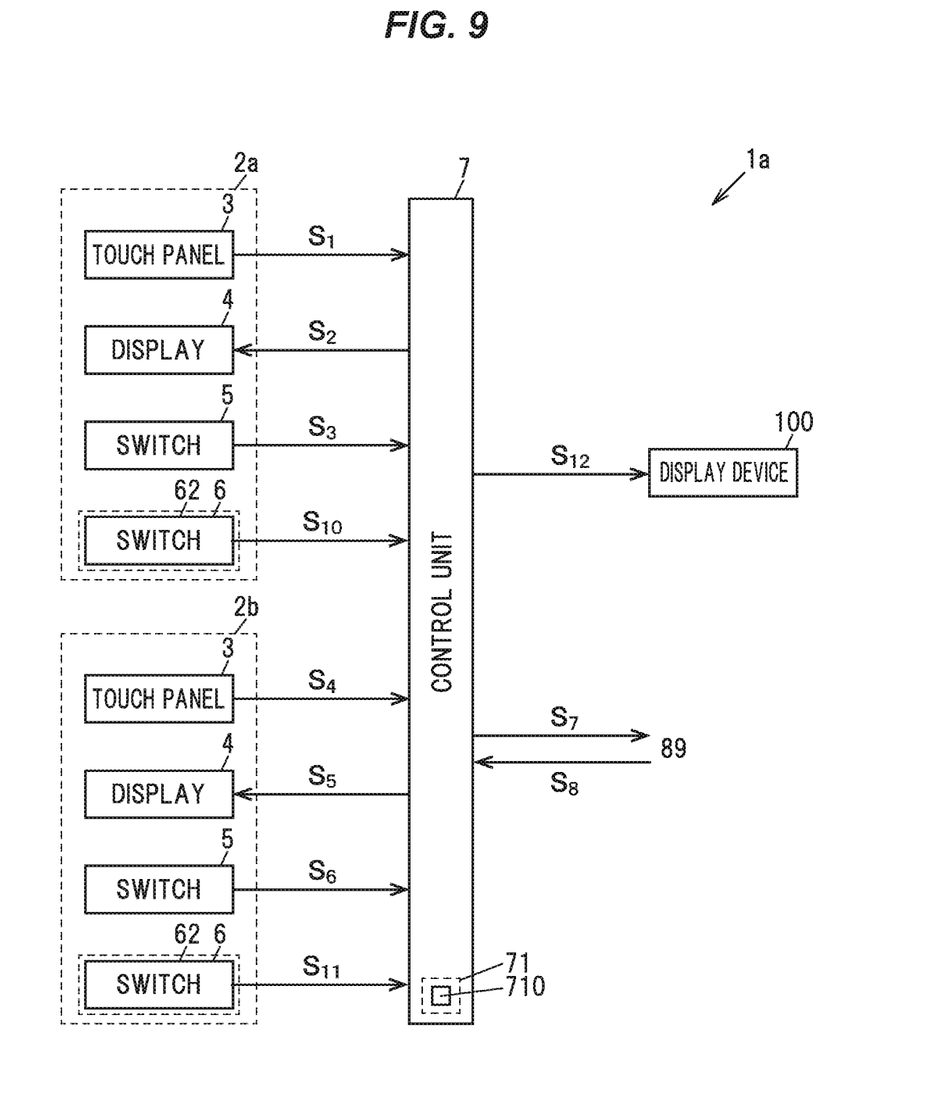
FIG. 9 is a block diagram illustrating a steering switch system in the third embodiment.

FIG. 9 is a block diagram illustrating a steering switch system 1a. The steering switch system 1a includes the steering switch device 1 described above and a display device 100.

The display device 100 is, e.g., at least one of the meter display 84, the main display 86, the head-up display 87 and the room mirror monitor 880, etc., as shown in FIG. 1A.

For example, after the selector switch 6 on the touch pad 2a side received an operation, the control unit 7 outputs the operation information $S_7$ to the operated device 89. Then, based on, e.g., the function information $S_8$ output from the operated device 89, the control unit 7 generates and outputs the display control signal $S_2$ to the display 4 and a display control signal $S_{12}$ to the display device 100 to switch the displayed function.

The steering switch system 1a can show the operable functions, etc., on the display device 100 in addition to the displays 4. Therefore, as compared to when such a configuration is not adopted, movement of the line of sight in a direction toward the steering wheel 85 is reduced and it is possible to improve operability while reducing movement of the line of sight of the user.

In yet another embodiment, the steering switch system 1a has the steering switch device 1 described above, the display device 100, and the operated device 89. In this case, the display device 100 may be configured as a monitor of the operated device 89.

When the display device 100 is configured as a monitor of the operated device 89, the display device 100 is controlled by the operated device 89. Therefore, the operated device 89 outputs the function information $S_8$ to the steering switch device 1 based on the operation information $S_7$ acquired from the steering switch device 1 and switches the function to be shown on the display device 100.

The steering switch device 1 and the steering switch system 1a in at least one of the embodiments as described above can be operated switching functions without degradation of the operational performance.

Although some embodiments and modifications of the invention have been described, these embodiments and modifications are merely examples and the invention according to claims is not to be limited thereto. These new embodiments and modifications may be implemented in various other forms, and various omissions, substitutions and changes, etc., can be made without departing from the gist of the invention. In addition, all combinations of the features described in these embodiments and modifications are not necessary to solve the problem of the invention. Further, these embodiments and modifications are included within the scope and gist of the invention and also within the invention described in the claims and the range of equivalency.

REFERENCE SIGNS LIST

1 STEERING SWITCH DEVICE
1a STEERING SWITCH SYSTEM
2a, 2b TOUCH PAD
3 TOUCH PANEL
4 DISPLAY
5 SWITCH
6 SELECTOR SWITCH
7 CONTROL UNIT
8 VEHICLE
84 METER DISPLAY
85 STEERING WHEEL
86 MAIN DISPLAY
87 HEAD-UP DISPLAY
880 ROOM: MIRROR MONITOR

The invention claimed is:

1. A steering switch device, comprising:
a display arranged on a front side of a spoke portion of a steering wheel of a vehicle to show a function of an operated device of the vehicle in a switching manner;
an input unit to receive an operation;
a selector switch arranged at at least one of an upper surface, a lower surface and a back surface of the spoke portion, and comprising an operating knob to switch the function shown on the display based on an operation in a direction intersecting a normal direction to a surface of the display; and a control unit to execute the function shown on the display based on the operation received by the input unit and to switch the function shown on the display based on an operation of the selector switch.

2. The steering switch device according to claim 1, wherein the display shows a plurality of functions.

3. The steering switch device according to claim 1, wherein the input unit comprises a touch detection unit to detect a touch operation that is performed when selecting the function shown on the display.

4. The steering switch device according to claim 1, wherein the input unit comprises a push detection unit to detect a push operation performed on the display.

5. The steering switch device according to claim 1, wherein the displays, the input units and the selector switches are arranged on the right and left of the steering wheel.

6. A steering switch system, comprising:
the steering switch device according to claim 1; and
a display device to show a view related to the display of the steering switch device.

7. The steering switch device according to claim 1, wherein the selector switch is configured such that a direction of the operation thereof makes a right angle with the normal direction to the surface of the display.

8. The steering switch device according to claim 1, wherein the operation knob is arranged at the back surface of the spoke portion, and
wherein the operation knob comprises a rotating shaft closer to a base portion to which the spoke portion is connected than a ring portion held by a user so as to switch the function shown on the display by being rotated around the rotating shaft by the operation in the intersecting direction.

9. The steering switch device according to claim 8, wherein the operation knob comprises a display portion arranged above the rotating shaft and configured such that a sign indicating the switching of the function is visible from the front side of the steering wheel.

10. The steering switch device according to claim 1, wherein the operation knob is arranged on at least one of the upper surface and lower surface of the spoke portion so as to switch the function shown on the display based on a push operation thereof.

* * * * *